H. W. FARLEY.
Assignor to C. H. SMITH & J. HEWITT.
Lightning-Rods.
No. 8,459. Reissued Oct. 22, 1878.
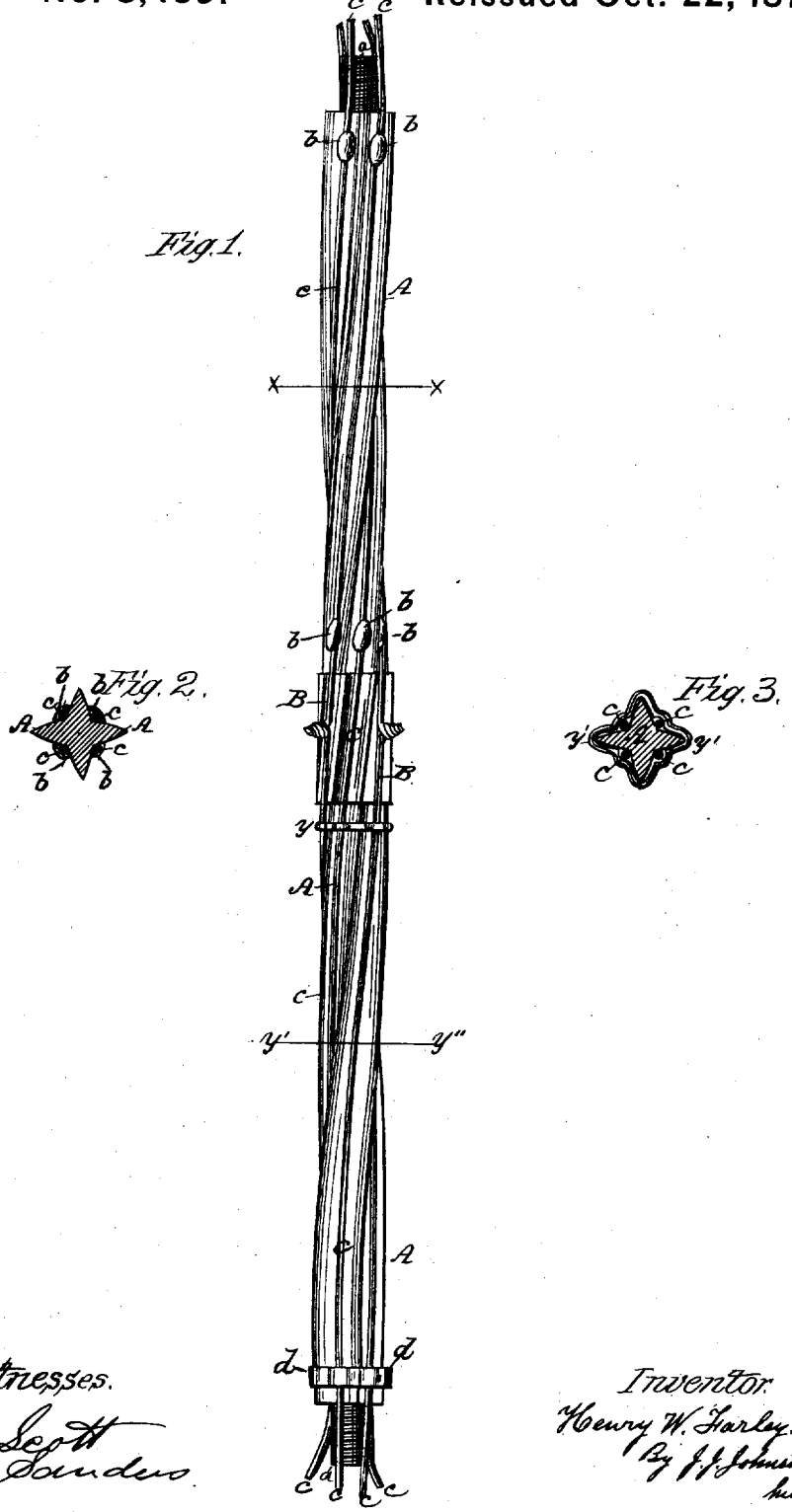
Witnesses.
Alex. Scott
H. P. Sanders
Inventor.
Henry W. Farley.
By J. J. Johnston
his attorney
N. PETERS, PHOTO-LITHOGRAPHER, WASHINGTON, D. C.

UNITED STATES PATENT OFFICE.

HENRY W. FARLEY, OF OSWEGO, ASSIGNOR TO CHARLES H. SMITH AND JOHN HEWITT, OF CHICAGO, ILLINOIS.

IMPROVEMENT IN LIGHTNING-RODS.

Specification forming part of Letters Patent No. 91,530, dated June 22, 1869; Reissue No. 8,459, dated October 22, 1878; application filed October 5, 1878.

*To all whom it may concern:*

Be it known that I, HENRY W. FARLEY, of Oswego, in the county of Kendall and State of Illinois, have invented certain new and useful Improvements in Lightning-Rods; and I do hereby declare that the following is a full and exact description thereof, reference being had to the accompanying drawings, and to the letters of reference marked thereon.

In constructing lightning-rods it has been found extremely difficult to produce an article combining the requisite qualities of cheapness, strength, and high conducting power. Those made of copper and other metals of superior conducting power, if made sufficiently strong, are so very expensive, and therefore are not in general use and the demand for them very limited.

The object of my invention is to produce a lightning-rod possessing the essentials of cheapness, strength, and superior conducting powers.

My invention relates to an improvement in lightning-conductors for buildings; and consists in constructing said conductor of an iron rod, (plain or galvanized,) having three or more flanges radiating longitudinally from a solid core, said rod being twisted so that said flanges form diagonal grooves around said core, and in combination therewith a strip or strips, or wire or wires, of metal possessing superior qualities for conducting electricity, and encircling the axis of said iron rod with said metal having superior conducting qualities.

To enable others skilled in the art to make and use my invention, I will proceed to describe its construction and operation.

In the accompanying drawings, which form part of my specification, Figure 1 represents a lightning-rod as improved. Fig. 2 represents a cross-section of Fig. 1 on the line *x x*. Fig. 3 is a cross-section of the same on the line *y' y''*.

In the annexed drawings, A represents a lightning-rod made of iron in the form known as the "star" or "volute" pattern—that is to say, a rod of iron having four flanges radiating from a solid core, and twisted so as to form diagonal grooves around said core—which is preferred for this purpose, as it combines the maximum of strength with the minimum of weight. This rod is usually rolled in lengths of about eleven feet, and the ends are provided with screws *a*, and the sections are secured together by a screw-coupling, B, so as to form a continuous rod.

The metal possessing the superior conducting powers is shown at *c c*. It consists of wires or strips of copper, or other suitable metal, which are laid in grooves or channels of the rod, where it may be secured by means of solder, as shown at *b b* in Figs. 1 and 2, or by means of wire *y* or sheet-metal socket, as shown at *d d* in Figs. 1 and 3.

The sheet-metal socket *d* is made to conform to the grooves and axis or core of the iron rod, and to the wire or wires or strip or strips in said grooves, and is used for holding the parts constituting the rod firmly together.

The wire or strips *c c* may be attached to the lengths of the rod before the same are secured together, and after said joints are coupled the ends of the wire or strips may be twisted together, as shown in Fig. 1; or they may be applied to said rod after it is in place, in which event no joint would be required, as the wire or strips could be readily applied in lengths corresponding to the entire length of the rod, and thus furnish a perfect unbroken conductor.

It will be observed by reference to Fig. 1 that, by the twisted or spiral form of the lightning-rod A and of the copper wire or strips *c c*, the axis of the rod A is encircled by the said wire or strips, thereby surrounding the baser metal of the rod with a metal possessing superior qualities as a conductor of electricity.

The advantages possessed by this construction are so obvious as to scarcely require mention. It will be seen that by it is formed a lightning-rod which, while being a perfect conductor, is strong, durable, and but little more expensive than the ordinary imperfect iron rod so commonly used.

I have described a single construction of my improvement in lightning-conductors; but the skilled mechanic will readily understand that the core or axis of the iron of the form hereinbefore described may be encircled with one or more of said wires or strips of metal having superior qualities for conducting electricity.

Having thus described my invention, what

I claim to be new, and desire to secure by Letters Patent, is—

1. A lightning-conductor constructed of a rod of iron having three or more flanges radiating from a solid core, said rod being twisted so that the flanges form diagonal grooves around said core, and in combination therewith a strip or strips of sheet metal possessing superior qualities for conducting electricity and encircling the axis of said iron rod, substantially as herein described.

2. A lightning-conductor constructed of a rod of iron having three or more flanges radiating from a solid core, said rod being twisted so that the flanges form diagonal grooves around said core, and in combination therewith a wire or wires of metal possessing superior qualities for conducting electricity and encircling the axis of said iron rod, substantially as hereinbefore described.

3. A lightning-conductor constructed of a rod of iron galvanized, having three or more flanges radiating from a solid core, said rod being twisted so that the flanges form diagonal grooves around said core, and in combination therewith a wire or wires of metal possessing superior qualities for conducting electricity and encircling the axis of said iron rod, substantially as herein described.

4. A lightning-conductor constructed of a rod of iron galvanized, having three or more flanges radiating from a solid core, said rod being twisted so that the flanges form diagonal grooves around said core, and in combination therewith a strip or strips of sheet metal possessing superior qualities for conducting electricity and encircling the axis of said iron rod, substantially as herein described.

5. A lightning-conductor constructed of a rod of iron, with flanges radiating from a solid core, in combination with a metal possessing superior qualities for conducting electricity, and the socket *d*, conforming to the contour of said rod in cross-section, substantially as herein described.

HENRY W. FARLEY.

Witnesses:
CHAS. W. ROLFE,
J. J. JOHNSTON.